Figure 7:
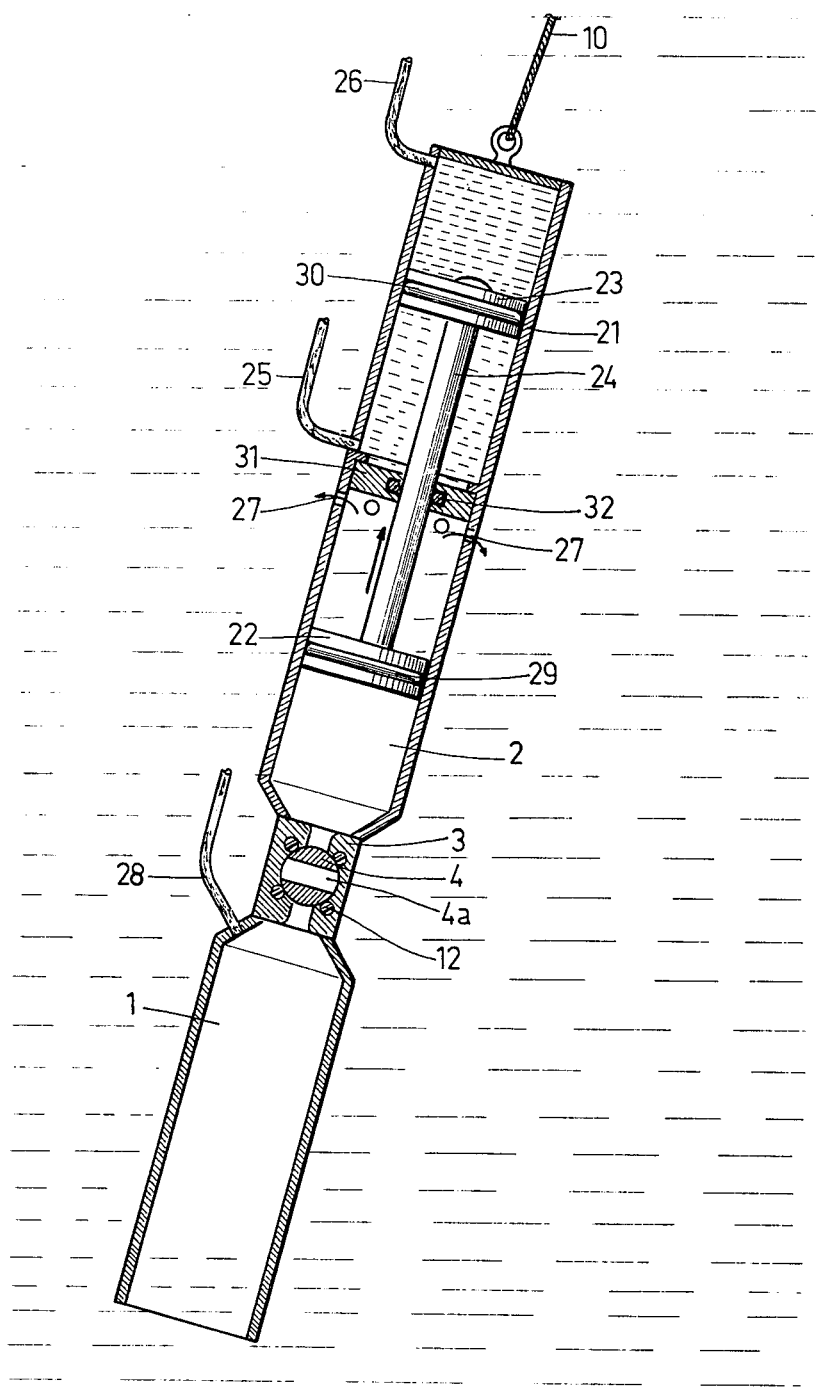

United States Patent [19]  
Cassand et al.

[11] 3,949,831  
[45] Apr. 13, 1976

[54] DEVICE FOR GENERATING ACOUSTIC WAVES IN A LIQUID MEDIUM

[75] Inventors: Jean Cassand, Rueil-Malmaison; Jean-Pierre Fail, Royan, both of France

[73] Assignee: Institut Francaise de Petrole, des Carburants et Lubrifiants, France

[22] Filed: Apr. 29, 1974

[21] Appl. No.: 465,343

Related U.S. Application Data

[63] Continuation of Ser. No. 250,365, May 4, 1972, abandoned.

[30] Foreign Application Priority Data

May 7, 1971 France .............................. 71.16727

[52] U.S. Cl................................ 181/120; 181/114
[51] Int. Cl.²......................................... G01V 1/38
[58] Field of Search.................... 181/120, 113, 114

[56] References Cited
UNITED STATES PATENTS

| | | | |
|---|---|---|---|
| 3,376,949 | 4/1968 | Baker et al. ........................ | 181/120 |
| 3,642,089 | 2/1972 | Parker et al. ....................... | 181/120 |
| 3,670,839 | 6/1972 | Savit ................................... | 181/120 |
| 3,721,311 | 3/1973 | Mott-Smith ......................... | 181/120 |
| 3,770,080 | 11/1973 | Laurent et al. ..................... | 181/120 |

*Primary Examiner*—Maynard R. Wilbur
*Assistant Examiner*—G. E. Montone
*Attorney, Agent, or Firm*—Craig & Antonelli

[57] ABSTRACT

A device for generating acoustic waves in a liquid, comprising two hollow enclosures communicating through a narrow passageway, a valve interposed in said passage way for controlling said communication, means for feeding a first one of said enclosures, in free communication with the ambient liquid, with pressurized fluid and suction means for reducing the pressure in the second enclosure to a level considerably lower than that prevailing in the first one.

16 Claims, 6 Drawing Figures

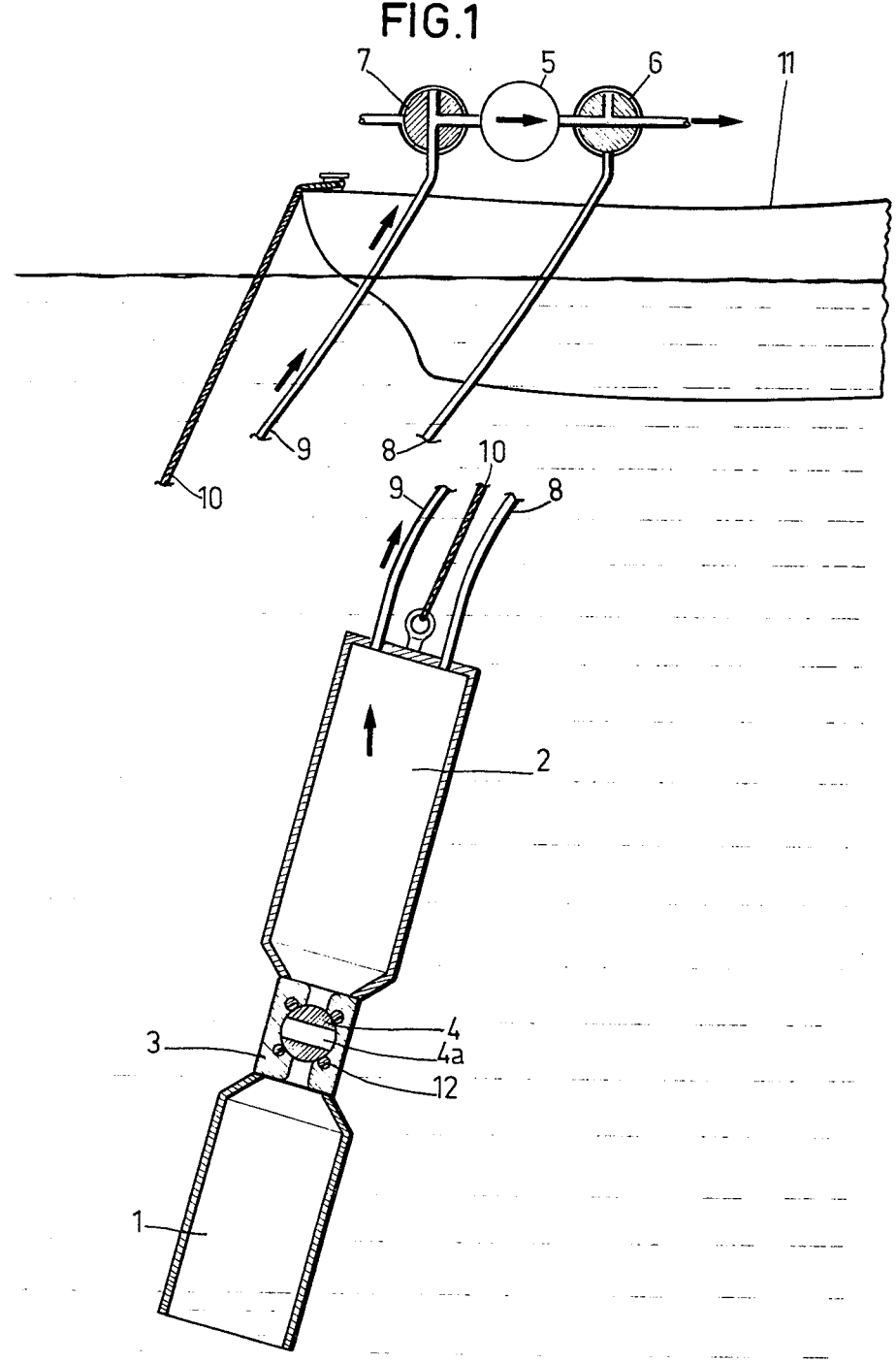

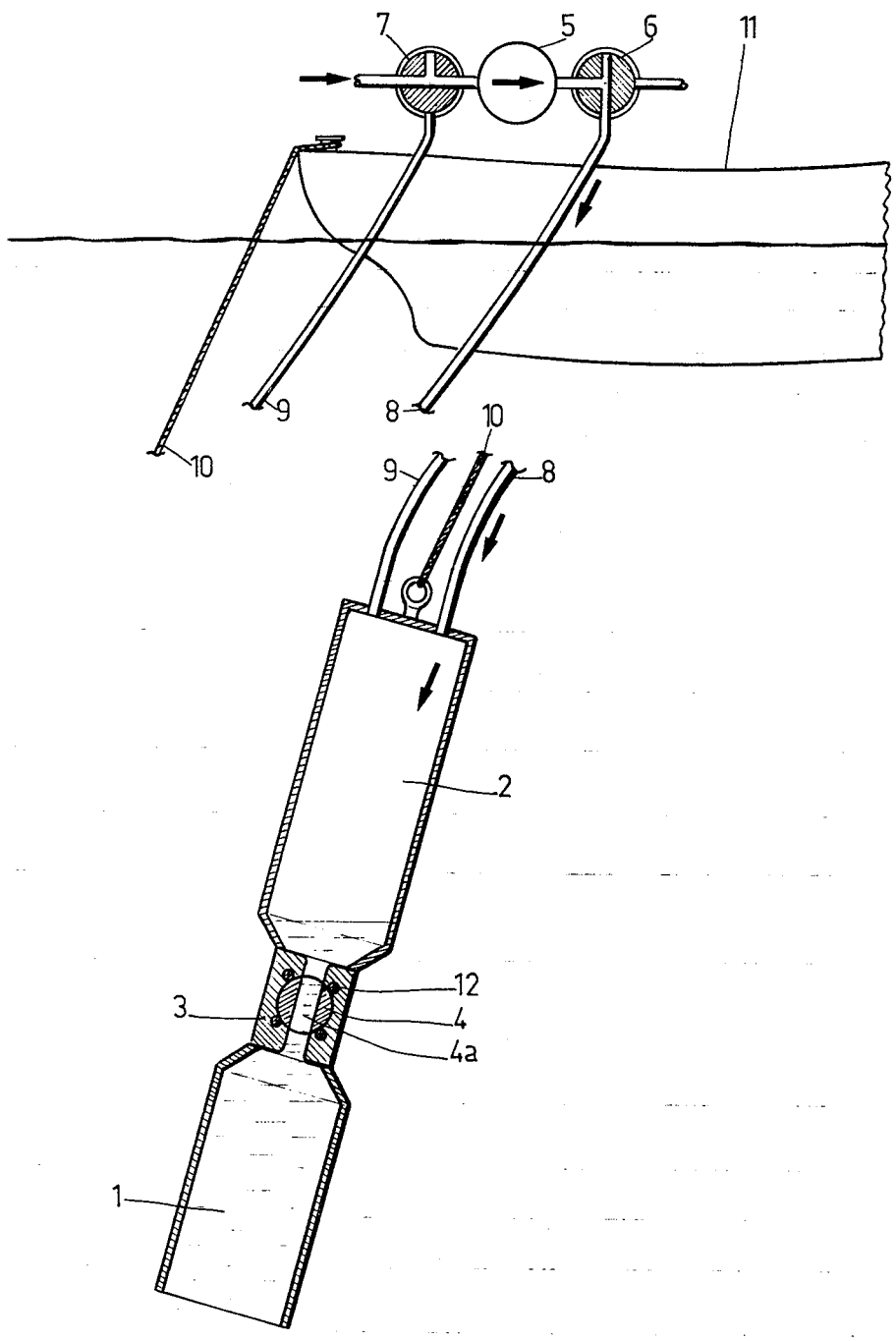

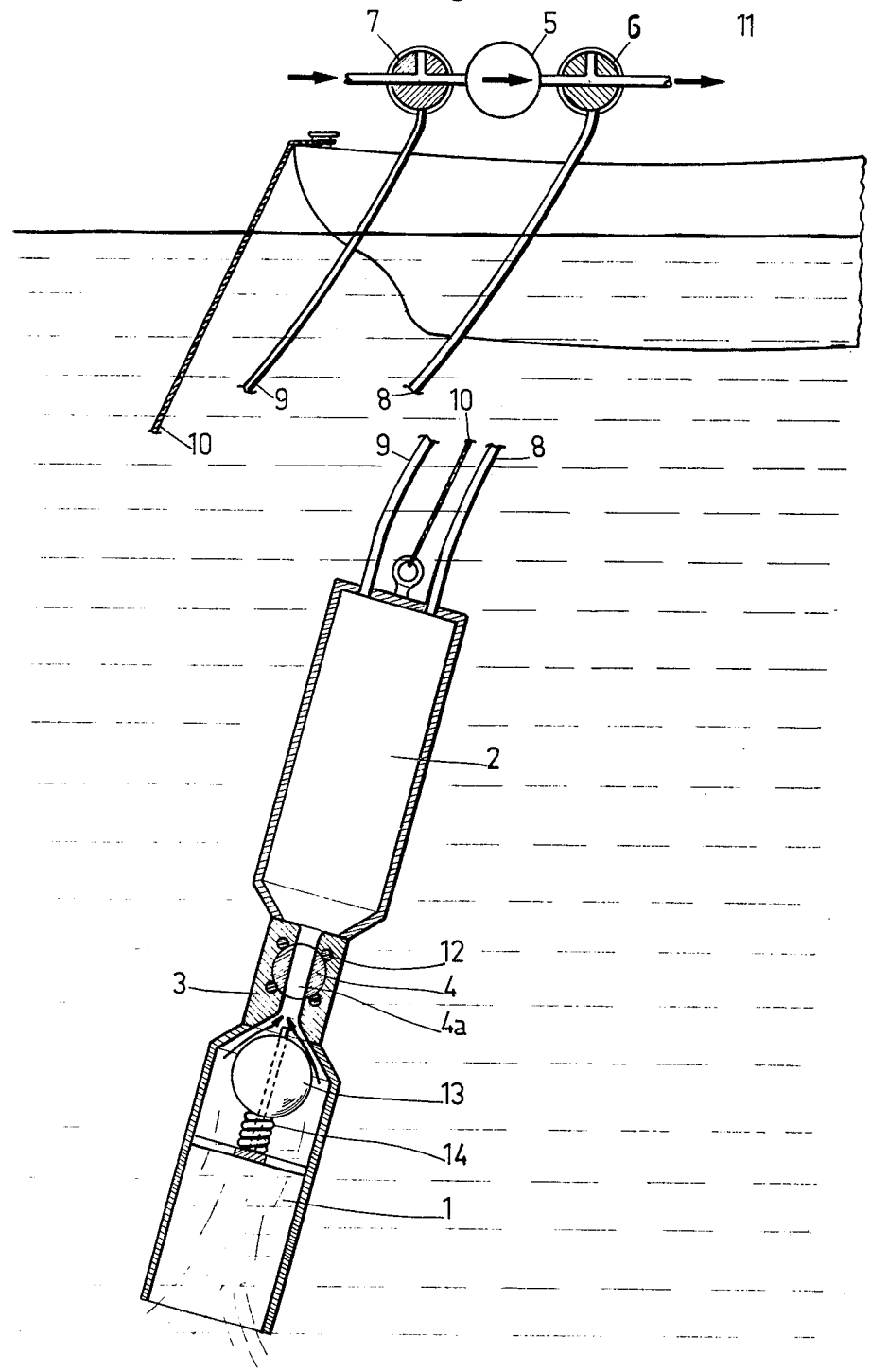

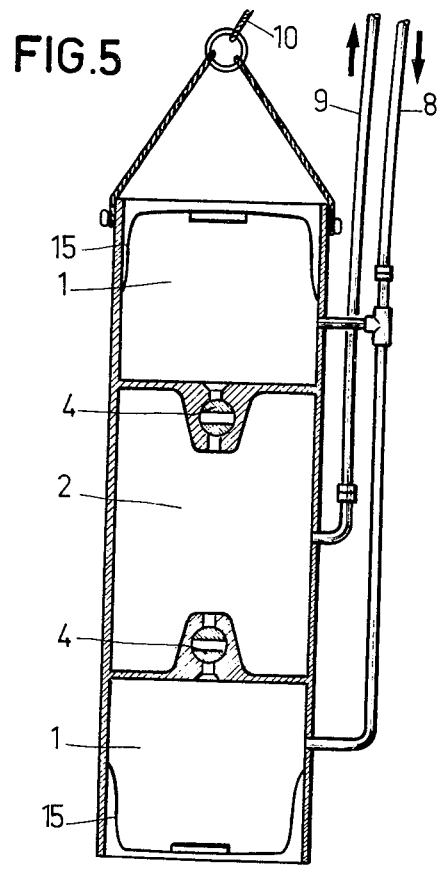
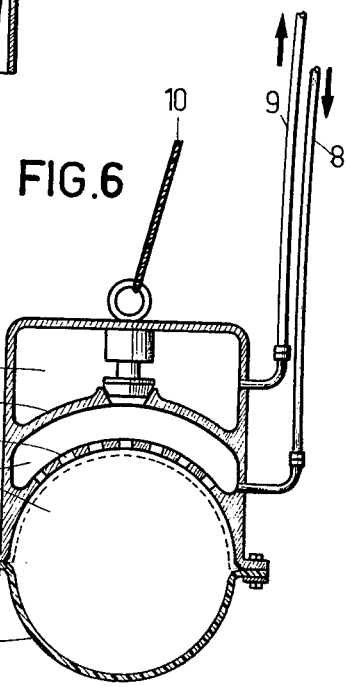
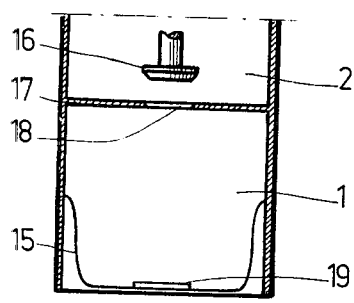

DEVICE FOR GENERATING ACOUSTIC WAVES IN A LIQUID MEDIUM

This is a continuation of application Ser. No. 250,365, now abandoned, filed May 4, 1972.

This invention relates to a device for generating acoustic waves in a liquid medium by abruptly braking a mass of water in motion, said device being particularly adapted for seismic prospecting.

The state of the art in the field of seismic prospecting may be illustrated, for example, by the U.S. Pat. No. 3,545,563, which describes the emission of acoustic waves in water and comprises essentially two plates provided with means for moving them apart from each other very abruptly, thereby generating a void space, so that water, when abruptly filling said space, produces an implosion resulting in the formation of an acoustic wave. The actuation for moving the plates apart from one another is energized by explosions of combustible mixture in an explosion chamber. The joining of the plates is achieved by means of air under a very high pressure.

It is an object of the invention to provide a device making use neither of combustible mixture nor of air under a very high pressure. Consequently it can be operated in a simpler way and is better adaptable to various utilizations. Moreover, its mechanical construction is very simple. it does not include any heavy mechanical part in motion and produces an energy greater than that obtained from the prior art devices.

This device essentially comprises a hollow enclosure with at least two hollow elements interconnected through a passage of narrow section or constriction. A first one of said elements is provided with an opening at its end opposite to the constriction, said end being intended to be immersed, whereas the second of said elements is closed at its end opposite to the constriction.

The enclosure is further provided with a system for insuring intermittently the sealing between the two elements and means for introducing fluid under pressure inside at least one of said elements and means for creating in the second element a pressure much lower than that prevailing in the first element.

The opening of the first element may be provided with a flexible membrane and said means may comprise compressor means and valves.

The invention will be now described more in detail with reference to the accompanying drawings, illustrating non-limitative embodiments of the device of the invention. In these drawings:

FIG. 1 is a diagrammatic longitudinal cross sectional view of the device; the valves being in position for suction from the second element;

FIG. 2 diagrammatically shows a longitudinal cross-sectional view of the device in which the valves are in the position for the discharge of water from the two elements;

FIG. 3 diagrammatically shows a longitudinal cross-sectional view of the device further provided with a clack valve having a calibrated spring;

FIG. 4 diagrammatically shows a partial view of a longitudinal cross-section of the device, in which the opening of the first element is provided with a membrane;

FIG. 5 diagrammatically shows a longitudinal cross section of an alternative embodiment of the device comprising two symmetrical enclosures each provided with a membrane;

FIG. 6 diagrammatically shows a longitudinal cross-sectional view of the device, in which the element comprising a membrane is further provided internally with a perforated rigid member used as an abutment for the membrane; and FIG. 7 diagrammatically shows a longitudinal cross-sectional view of an alternative embodiment of the device, comprising a hydraulic jack for creating in the second element a pressure much lower than that prevailing in the first element.

In accordance with FIGS. 1 and 2, the generating device according to the invention comprises two tubular elements 1 and 2 interconnected through a narrow passage or constricted part 3. This device may be formed of a strong material, preferably transparent to the acoustic waves. It can be made of steel.

A two-way valve 4 may establish a communication between said elements 1 and 2 or tightly separate them. The tubular element 1 is open at the end thereof opposite to the constricted part, whereas the tubular element 2 is closed at the end thereof opposite to the constricted part.

The element 2 is provided with a circuit for introducing a pressurized gas inside said element and for discharging the same and creating vacuum therein. This circuit comprises a compressor 5 connected through two valves, 6 and 7 respectively, to two pipes 8 and 9 each opening into the tubular element 2.

The valve 6 has a position of discharge to the atmosphere and a position of discharge into the element 2.

The valve 7 has a position of suction from the atmosphere and a position of suction from element 2.

The whole device is immersed and connected, through a cable 10, to a surface installation 11.

The valve 4, illustrated in FIG. 1, is a spherical valve whose body comprises a channel 4a interconnecting the tubular elements 1 and 2 when its longitudinal axis is in the direction of the longitudinal axis of the constricted part 3. Joints 12 insure the sealing between the channel 4 a and the elements 1 and 2 during the period of closure of the valve 4.

This device is operated as follows.

The valve 4 being open, the valve 6 in position of discharge towards the tubular element 2 and the valve 7 in position of suction from the atmosphere (FIG. 2), the compressor 5 introduces air through the pipe 8 and the valve 6, into the tubular element 2 until it also occupies the interior of the element 1, by expelling the water through the opening thereof. The valve 4 is then closed.

After having actuated the valve 6 to a position of opening to free air and the valve 7 to a position of suction from element 2 (FIG. 1), the compressor 5 discharges, through pipe 9 and valve 7, the air contained in the tubular element 2, and substantially creates vacuum therein.

At this moment, the valve 4 is opened. The compressed air contained in the tubular element 1 expands into element 2, and the mass of external water rushes into element 1. The movement of this mass of water is abruptly braked by the constrictive part 3. It results in a shock or water hammer affect which creates an acoustic wave to be used for seismic prospection.

The valve 4 and the circuit for compressed air supply and discharge, are controlled from the surface installation, the control circuit being not shown.

The operation can be thus repeated at will, while the surface installation moves along a selected travel path and carries out "shots" at a high rate, for example, every 10 seconds.

FIG. 3 illustrates the same device as FIG. 1, further provided with an adjustable clack valve 13. This clack valve is provided with a return spring 14. This spring 14 is so calibrated that the clack valve 13 will not be displaced by air rushing into the element 2 but will be displaced by water reaching the constriction. The calibration of this spring is easy since the water stream exerts on the clack valve a driving force considerably higher than that exerted by the air stream. The clack valve thus obturates the constricted part 3 when it is pushed by water.

The acoustic energy obtained by this device is far higher than that obtained by the device without clack valve.

Many types of valve may be used for obturating the constricted part 3.

It is also possible, without departing from this invention, to have the pipe 8 for introduction of compressed air, or a derivation of said pipe, directly opening into element 1.

According to an alternative embodiment of the device which is diagrammatically shown in detail in FIG. 4, the open part of element 1 may be provided with a flexible membrane 15. The constricted part between elements 1 and 2 may be formed, for example, by a wall 17 provided with an orifice 18 intermittently closed by a clack valve 16, either mechanically or electro-magnetically controlled or also by a throttle valve. When a state of depressurization is obtained in the element 2, and the position of the clack valve 16 is opened allowing the communication between the elements 1 and 2, the mass of water rushes into the cavity of element 1, thereby pressing the membrane against the wall separating the elements 1 and 2. In order to avoid sucking the membrane through the orifice 18 left open by the clack valve, the membrane is provided with a rigid member 19 at a place corresponding to that of the orifice 18.

The mass of water is abruptly stopped, thus resulting in the creation of an acoustic wave, according to the same principle as indicated above, and by using this embodiment any water penetration into the element 2 is avoided.

In order to increase the energy of the emission source, two devices of the preceding type can be coupled (FIG. 5). In this case, the element 2 is common and the elements 1 are placed on both sides of this element, forming the opposite ends of the system.

According to another embodiment of the device illustrated in FIG. 6, the element 1, still provided with a membrane 15, is also provided interiorly with a wall 20 perforated with several holes of small diameter. During the period of depressurization in the element 2, the membrane is pressed against this wall without substantial deformation into the orifices, due to their great number and small size. In such a case, the rigid member 19 is no longer necessary.

According to the embodiment illustrated in FIG. 7, the device comprises a cylinder 21 connected integrally with the tubular element 2 and extending the same in a direction opposite to the constricted part 3. Two pistons 22 and 23 slide respectively in the element 2 and in the cylinder 21 and are made integral with each other, through a rod 24 passing across the terminal wall 31 common to the element and the cylinder. The two pistons are provided at their periphery with sealing joints 29 and 30. The sealing between the element 2 and the cylinder 21 is insured by means of a joint 32. Two pipes 25 and 26 open on opposite sides of the piston 30 and are connected to a circuit (not shown) supplying pressurized fluid, oil for example. The device comprises a valve 4 identical to that of the embodiment of FIG. 1. It further comprises a pipe 28, fed with compressed fluid (air for example) which opens in a portion of element 1 which is the closest to the constricted part 3. The element 2 communicates in the vicinity of the end wall 31 with the external medium through orifices 27 provided in the wall of said element.

This device is operated as follows.

The valve 4 being opened, fluid under pressure is introduced through the pipe 26 and pushes the piston 23 towards the end wall 31. The piston 22 connected with the piston 23 expells into element 1 the major part of the water mass contained therein. The valve 4 is then closed and fluid is injected into pipe 28 in order to discharge from element 1 the major part of the water contained therein. Pressurized fluid is thereafter injected through pipe 25. The back motion of the piston 23 drives piston 22 up to the end wall 31. A very high depressurization is generated in the part of element 2 located between the constricted part 3 and the piston 22, due to the motion of the latter. The abrupt introduction of water produced by the opening of valve 4, and its braking by the constricted part 3 generates an acoustic wave as hereabove described.

It is also possible to have the pipe 28 opening into the compartment 2 in the vicinity of the constricted part 3. In this case, when the piston is, at the end of its forward stroke, in the vicinity of the constricted part 3, with the valve 4 being open, fluid is injected through pipe 28. The water is then expelled from the residual volume of compartment 2, delimited by the piston 22 and the constricted part 3, and also from compartment 1.

Other embodiments may of course be contemplated without departing from the scope of the invention. The system formed by the cylinder 21 and the two integral pistons 22 and 23, may for example be adapted to any other one of the described embodiments.

More generally, the invention may be modified according to individual preference or conditions without necessarily departing from the scope of this disclosure and the scope of the appended claims.

What we claim as this invention is:

1. A device for generating acoustic waves in a liquid medium comprising a hollow enclosure immersed in operation in the liquid medium including at least one first elongated member and at least one second elongated member communicating with the first member through at least one constricted part, said constricted part having a cross-section substantially reduced with respect to the cross-section of said first and second members, the first member being open to the liquid medium at an end remote from said constricted part, valve means for selectively intermittently separating and communicating said first and second members, said valve means including a valve seat and blocking means provided with a calibrated spring means, said spring means being calibrated to provide said constricted part in open communication between said first and second members when said spring means is free from stress, means for introducing in at least said first member pressurized fluid having a pressure at least equal to the pressure of the liquid medium, means for creating in the second member a pressure considerably lower than that prevailing in said first member, and means for obtaining communication between said first and second members through said valve means when a pressure difference is established between said first and second members such that said liquid medium rapidly enters said first member upon obtaining said communication between said first and second members to be abruptly braked at said constricted part.

2. A device according to claim 1, wherein the first and second members are tubular.

3. A device according to claim 1, wherein said valve means further includes a two-position valve, a first position of said two-position valve establishing communication between said first and second members through said constricted part, and a second position of said two-position valve effecting sealing separation of said first and second members.

4. A device according to claim 1, wherein the means for creating in the second member said considerably lower pressure comprises a first piston and means for slidably moving said first piston inside said second member.

5. A device according to claim 4, wherein said means for slidably moving said first piston comprises a second piston integrally connected with said first piston and pressure means for controlling the movement of said second piston with respect to a third elongated member integral with said second member.

6. A device according to claim 1, wherein said means for introducing pressurized fluid comprises pipe means operatively connected to said first member near the constricted part.

7. A device according to claim 6, wherein said means for introducing further includes second pipe means operatively connected to said second member near the constricted part.

8. A device according to claim 1, wherein said hollow enclosure includes two first elongated members, each said first elongated member having an open end and being in communication with opposite ends of said second member through two constricted parts, each located at the end of each first member remote from the open end.

9. A device according to claim 1, wherein said spring means is calibrated to maintain said blocking means in an open position against the pressure of said pressurized fluid and to provide said blocking means in a closed position upon pressure from said liquid medium.

10. A device according to claim 1, wherein said blocking means seats against said valve seat to close said valve means only upon being subjected to pressure of the liquid medium reaching said constricted part.

11. A device according to claim 1, wherein said valve means further includes a valve associated with said constricted part for selectively intermittently opening and closing said constricted part.

12. A device according to claim 11, wherein said valve is remotely controlled to open and close said constricted part.

13. A device according to claim 1, wherein said valve means is remotely controlled to separate and communicate said first and second members.

14. A device according to claim 3, wherein said two-position valve is remotely controlled to be in said first and second positions.

15. A device for generating acoustic waves in a liquid medium comprising a hollow enclosure immersed in operation in the liquid medium including at least one first elongated member and at least one second elongated member communicating with the first member through at least one constricted part, said constricted part having a cross-section substantially reduced with respect to the cross-section of said first and second members, and said first member being open at an end remote from said constricted part to allow said liquid medium to enter into said first member, means for establishing a pressure differential between said first and second members, and valve means associated with said constricted part for selectively opening and closing said constricted part such that communication of said first and second members is controlled, said constricted part being opened upon establishing said pressure differential such that said liquid medium rapidly enters said first member and is abruptly braked at said constricted part.

16. A device according to claim 15, wherein said valve means includes a remotely controlled valve.

* * * * *